Patented Oct. 14, 1930

1,778,567

UNITED STATES PATENT OFFICE

EBENEZER EMMET REID, OF BALTIMORE, MARYLAND, AND GEORGE L. SCHWARTZ, OF WILMINGTON, DELAWARE, ASSIGNORS TO E. I. DU PONT DE NEMOURS & COMPANY, OF WILMINGTON, A CORPORATION OF DELAWARE

CELLULOSIC COMPOSITION

No Drawing. Application filed May 16, 1925. Serial No. 30,872.

This invention relates to cellulosic compositions containing as an essential constituent a cyclohexyl phthalate, and has more particular reference to cellulose nitrate compositions, for example, coatings and plastics, containing cyclohexyl butyl phthalate.

In the practical use of dissolved cellulose and soluble cellulose compounds, including cellulose esters, in the arts, as in making films, coatings for artificial leather, plastics and so on, it is customary to add to the cellulose ester, or its solution, certain non-cellulosic materials commonly termed softeners, camphor substitutes or the like, such additions being made for the purpose of imparting some desired properties, such as non-inflammability, flexibility and so forth. For convenience, we shall herein term these materials "modifiers". The modifiers discussed herein as particularly related to the invention serve primarily as softeners and camphor substitutes in the manufacture of cellulose nitrate coatings and plastics.

We have found that cyclohexyl phthalates, including broadly esters of phthalic acid in which the hydrogen radical of at least one of the two carboxyl groups is substituted by a cyclohexyl group, are desirable modifiers for cellulosic compositions, certain of their advantages being their very low volatility at room temperature, very excellent solvent power, and their stability. This class of esters includes the acid cyclohexyl phthalate and the mixed esters such, for example, on the one hand as cyclohexyl isopropyl phthalate, cyclohexyl n-butyl phthalate, cyclohexyl amyl phthalate, cyclohexyl benzyl phthalate, and other cyclohexyl alkyl phthalates, and on the other hand as cyclohexyl phenyl phthalate, cyclohexyl xylyl phthalate, and other cyclohexyl aryl phthalates, all of which esters have the following general graphical formula:

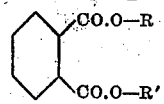

in which R stands for the cyclohexyl group and R' represents a hydrogen, alkyl, or aryl radical.

We may say, however, that we have found certain of the esters more suitable, due say to certain physical characteristics, than others. Thus, cyclohexyl butyl phthalate is particularly desirable, while on the other hand the neutral (or di-) cyclohexyl phthalate is, generally speaking, somewhat difficult of application because of its high viscosity. Which ester will be most suitable under specified conditions will depend somewhat upon ease of application and like factors under the particular circumstances existing, as will be evident to those skilled in the art of using modifiers and preparing cellulosic compositions for coating and so on.

In preparing cellulosic compositions embodying the invention the esters may be used in various proportions depending upon the particular results sought. For example, for pyroxylin (12% nitrogen) artificial leather coatings containing the usual amount of pigment the esters, particularly cyclohexyl butyl phthalate, can be used in the ratio of ester 0.60—pyroxylin 1.00, to ester 1.40—pyroxylin 1.00. In clear pyroxylin coatings the ester ratio is correspondingly reduced. In pyroxylin plastics the esters may be used as camphor substitutes in the ratio of camphor that is regularly employed for such plastics; and may be used similarly in the preparation of pyroxylin, pyroxylin lacquers, and pyroxylin for split leather coatings. Furthermore, in compositions wherein castor oil is generally used as a softener, the composition may be made up with the esters as substitutes for the castor oil, to improve pliability. Again, where a composition is required having a solvent softener with a vapor pressure considerably lower than that of dibutyl phthalate or camphor, the composition may with advantage be made up with said esters. Cyclohexyl alkyl phthalates may be combined as softeners with other soluble cellulose compounds, for example, we may use cellulose acetate combined with 1% of cyclohexyl butyl phthalate.

While the present invention is not primarily concerned with the preparation of modifiers of the type indicated, the method of making mixed esters may be illustrated by the following example relating to the production of cyclohexyl normal-butyl phthalate:—

One molecular portion of cyclohexanol (boiling point 158–174° C.—95% distilling at 161° C.), and one molecular portion of phthalic anhydride are heated together several hours at 150° C. until analysis shows that practically all of the alcohol has been esterified. Normal butyl alcohol (about two molecular portions) is then added to the mixture and heated at a refluxing temperature under atmospheric pressure. The condenser is packed with glass rings or other condensing materials so that the butyl alcohol-water mixture, which boils below the boiling point of water, distils over. An excess of butyl alcohol is maintained in the reacting mixture until analysis shows that the acid has been practically neutralized, when the reflux condenser is changed to a distilling position and the temperature is raised gradually to 200° C. In the last stages of heating a stream of nitrogen is passed through the mixture to remove the last traces of butyl alcohol. Only a small amount of cyclohexanol is lost. The ratio of cyclohexanol to butyl alcohol that reacts can be approximately regulated so that any mixture of esters can be obtained grading from pure dibutyl phthalate through cyclohexyl butyl phthalate to dicyclohexyl phthalate, including mixtures of all of the pure and mixed esters that are possible from the two alcohols and the anhydride.

Cyclohexyl butyl phthalate, containing cyclohexanol and butyl alcohol radicals in approximately equal ratio, is a transparent liquid at ordinary temperatures, with a viscosity sufficiently low to render it readily and easily usable as a modifier. It colloids dry nitrocellulose readily at 21° C. and rapidly at 50° C. Although, as has been indicated, cyclohexyl butyl phthalate is associated, when prepared according to the process given, with certain amounts of dibutyl phthalate and dicyclohexyl phthalate, these can be disregarded so far as the use of the cyclohexyl butyl phthalate itself as a softener is concerned.

While particular reference has been made above to pyroxylin compositions, it will be understood that the invention is not confined thereto, since other cellulosic compositions, as those of cellulose acetate, are within the purview of the invention so far as the said modifiers find beneficial use therein.

Cyclohexyl phthalates are claimed, and their preparation described, in Patent 1,643,393, granted September 27, 1927, on our copending application, Serial No. 575,311, filed July 15, 1922.

By the term "alkyl" as used herein we mean a radical of an aliphatic hydrocarbon.

We claim:

1. A composition containing a cellulose ester and a mixed cyclohexyl ester of phthalic acid.

2. A composition containing a cellulose ester and a cyclohexyl ester of phthalic acid having the following graphical formula:

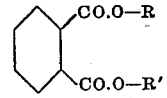

wherein R stands for the cyclohexyl group, and R' represents an alkyl radical.

3. A composition containing cellulose nitrate and cyclohexyl butyl phthalate.

In testimony whereof we affix our signatures.

EBENEZER EMMET REID.
GEORGE L. SCHWARTZ.